3,639,658
PHENOLIC RESIN COMPOSITIONS MODIFIED
WITH AN EPSILON CAPROLACTONE
Anthony C. Soldatos, Kendall Park, N.J., assignor to
Union Carbide Corporation, New York, N.Y.
No Drawing. Filed Apr. 1, 1969, Ser. No. 812,343
Int. Cl. C08g 5/18
U.S. Cl. 260—59                                  9 Claims

ABSTRACT OF THE DISCLOSURE

This invention relates to phenolic resin compositions, containing an epsilon caprolactone, which are characterized by an excellent balance of properties, that is, by excellent flow characteristics and by excellent cure speed and are particularly suited for use in molding applications to form thermoset products having excellent chemical and physical properties and are also particularly suited for use as binders in the production of fiber reinforced laminates and composite structures.

---

This invention relates to phenolic resin compositions containing an ε-caprolactone. More particularly, this invention relates to phenolic resin compositions, containing an ε-caprolactone, which are characterized by excellent cure speed and by excellent flow characteristics, these characteristics allowing for the successful use of these compositions in high speed molding applications to form thermoset products of desired configuration having excellent physical and chemical properties, and also allowing for the successful use of these compositions as binders in the production of fiber reinforced laminates and composite structures.

Phenolic resin compositions, which are currently known, have been found to be deficient for use in high speed molding applications, in that the cure speed of these compositions is either too slow, resulting in an incompletely cured product, or the flow characteristics of these compositions is poor, resulting in so-called "molding shorts." A "molding short" occurs when a composition cures to the thermoset condition before it adequately fills the mold cavity.

Furthermore, it has been found that phenolic resin compositions, which are currently known, exhibit relatively poor "wetting" properties when used as binders in the production of fiber reinforced laminates and composite structures. Consequently, it has been necessary to utilize relatively large amounts of these compositions in order to insure that the fibers are adequately "wet" or coated with the phenolic binder so that upon being thermoset, generally upon the application of heat, the phenolic compositions will effectively bind the fibers to form reinforced structures of improved chemical and physical properties.

The present invention provides phenolic resin compositions which are excellently suited for use in molding applications as these compositions have excellent cure speed and excellent flow characteristics. The compositions of this invention can be molded into products of desired configuration, which are characterized by excellent chemical and physical properties, utilizing molding cycles of relatively short duration. In addition, the phenolic resin compositions of this invention, by reason of their excellent flow characteristics, have excellent wetting properties when used as binders in the production of fiber reinforced laminates and composite structures. As a result of their excellent wetting properties, i.e., excellent binder efficiency, the amount of binder used in a particular application can be substantially reduced, as opposed to currently known phenolic resin compositions.

The compositions of this invention are based on a phenol-aldehyde resin in admixture with an ε-caprolactone wherein the ε-caprolactone is present in an amount of about 1 percent by weight to about 50 percent by weight and preferably about 5 percent by weight to about 25 percent by weight, based on the solids content of the phenol-aldehyde resin.

The solids content of the phenol-aldehyde resins is determined according to the following procedure, in those instances wherein the phenol-aldehyde resin is a liquid: A 1.5 gram sample of the phenol-aldehyde resin is heated in an oven, which is at a temperature of 135° C. for three hours. The residue is then cooled to room temperature, i.e., 23° C. and weighed. The numerical weight of the residue is divided by the numerical weight of the sample and the result multiplied by 100. The result obtained represents the percent weight, on a solids basis, per 1.5 grams of liquid resin.

Suitable phenol-aldehyde resins, or more specifically suitable condensation products of a phenol and aldehyde, are the condensates, generally acid catalyzed, referred to as "novolac resins" and condensates, generally alkaline catalyzed referred to as "resole resins."

Condensates, referred to as "novolac resins" are usually prepared by condensing a phenol and an aldehyde in the presence of an acid such as oxalic acid, sulfuric acid and the like or in the presence of a metal salt of an acid such as zinc acetate; wherein the aldehyde is present in the reaction mixture in less than stoichiometric amounts. Novolac resins are generally fusible, brittle, grindable resins which can be converted to the infusible state by the addition thereto of a methylene generating agent such as hexamethylenetetramine.

Condensates generally referred to as "resole resins" are usually prepared by condensing a phenol and an aldehyde in the presence of a base such as an alkali metal oxide or hydroxide or an alkaline earth metal oxide or hydroxide, as for example, sodium hydroxide, potassium hydroxide, calcium hydroxide, calcium oxide and the like, or an amine, or ammonia; wherein the aldehyde is present in the reaction mixture in greater than stoichiometric amounts. The resoles can be either liquid resins, soft resins having a low melting point or hard, brittle grindable resins and are heat-hardenable per se to the infusible state, that is, they will thermoset to infusible products under the influence of heat.

Illustrative of suitable phenols which can be condensed with an aldehyde to produce suitable phenol-aldehyde resins are the monohydric as well as the polyhydric phenols.

Among suitable monohydric phenols can be noted; phenol, and those phenols having the general formula:

Formula I

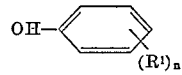

wherein $n$ is an integer having a value of 1 to 2 inclusive, each $R^1$, which can be the same or different, is an alkyl radical containing from 1 to 6 carbon atoms inclusive, an alkoxy radical containing from 1 to 6 carbon atoms inclusive, or a halogen, i.e., chlorine, bromine, iodine, and fluorine; with the proviso that at least three positions other than meta to the hydroxyl group are unsubstituted.

Specific phenols falling within the scope of Formula I are: alkylated phenols, exemplary of which are m-cresol, m-ethylphenol, m-propylphenol, m-isopropylphenol, m-sec butylphenol, m-amylphenol, m-n-hexylphenol, and other like phenols, as well as the commercially available meta-cresol which contains small amounts of both the para and the ortho isomers; alkoxylated phenols, exemplary of which are m-methoxyphenol, m-ethoxyphenol, m-propoxyphenol, m-n-hexoxyphenol, 3,5-dimethoxyphenol, and the like: halogenated phenols such as meta-chlorophenol, meta-bromophenol, and the like. Also suitable are cycloalkenyl phenols such as p-cyclopentenyl phenol, p-cyclohexenylphenol and the like.

Among suitable polyhydric phenols can be noted resorcinol, and the like, as well as polyhydric, polynuclear phenol having the formula:

Formula II

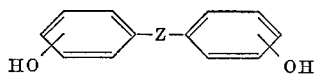

wherein Z is a divalent radical, as for example, sulfur, oxygen, alkylidene, alkylene and the like; as well as substituted derivatives of phenols falling within the scope of Formula II.

Exemplary of specific polyhydric, polynuclear phenols are the following:

bis(hydroxyphenyl)alkanes such as 2,2-bis(4-hydroxyphenyl)propane, commonly referred to as Bisphenol A,
2,4'-dihydroxydiphenylmethane,
bis(2-hydroxyphenyl)methane,
bis(4-hydroxyphenyl)methane,
1,1-bis(2-hydroxyphenyl)ethane,
1,2-bis(4-hydroxyphenyl)ethane,
1,1-bis(4-hydroxy-2-methylphenyl)ethane,
2,2-bis(2-isopropyl-4-hydroxyphenyl)propane,
2,2-bis(4-hydroxyphenyl)pentane,
3,3-bis(4-hydroxyphenyl)pentane,
2,2-bis(4-hydroxyphenyl)heptane,
bis(4-hydroxyphenyl)phenylmethane,
bis(4-hydroxyphenyl)cyclohexylmethane,
1,2-bis(4-hydroxyphenyl)-1,2-bis(phenyl)propane,
2,2-bis(4-hydroxyphenyl)-1-phenylpropane and the like; dihydroxy biphenyls such as 4,4'-dihydroxybiphenyl, 2,2'-dihydroxybiphenyl, 2,4'-dihydroxybiphenyl and the like; di(hydroxyphenyl)sulfones such as bis(4-hydroxyphenyl)sulfone, 2,4' - dihydroxydiphenylsulfone, di(hydroxyphenyl)ethers such as bis(4-hydroxyphenyl) ether and the like.

Examples of aldehydes which can be condensed with the phenols listed above to produce the phenol-aldehyde resins are: formaldehyde in any of its available forms, i.e., formalin and para-formaldehyde; furfural and the like.

For a detailed discussion of condensates produced from a phenol and an aldehyde and methods for the production thereof, reference is made to the books: "Phenoplasts" by T. S. Carswell, published in 1947 by Interscience Publishers and "Chemie der Phenolharze" by K. Hultzsch, Springer Verlag, 1950.

Among suitable epsilon caprolactones (ε-caprolactones) for purposes of this invention are those having the formula:

Formula III

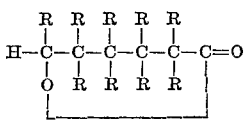

wherein each R, which can be the same or different, is hydrogen, halogen, i.e., chlorine, bromine, iodine or fluorine or a monovalent hydrogen radical containing, generally, a maximum of 12 carbon atoms and preferably a maximum of 6 carbon atoms, wherein at least six of the R's are hydrogen.

Illustrative of suitable monovalent hydrocarbon radicals for R are the following: alkyl radicals such as methyl, ethyl, n-propyl, 2-ethylhexyl, dodecyl, chloromethyl, bromoethyl and the like, alkoxy radicals such as methoxy, ethoxy, n-propoxy, n-hexoxy, n-dodecoxy and the like; cycloaliphatic radicals such as cyclopentyl, cyclohexyl and the like; aryl radicals such as phenyl, ethylphenyl, n-propylphenyl, n-butylphenyl and the like, aryloxy radicals such as phenoxy, n-propylphenoxy, n-butylphenoxy and the like. Other suitable ε-caprolactones, described in U.S. Pat. 3,169,945 to F. Hostettler et al. and falling within the scope of Formula III, are: ε-caprolactone, β-methyl-ε-caprolactone, γ-methyl-ε-caprolactone, δ-methyl-ε-caprolactone, ε-methyl-ε-caprolactone, β,δ-dimethyl-ε-caprolactone, β-chloro-ε-caprolactone, γ-ethoxy-ε-caprolactone, ε-phenyl-ε-caprolactone and the like.

The compositions of this invention can be formulated by a number of convenient methods. A particularly preferred method of preparation involving "resole resins" is one wherein a condensate of a phenol and an aldehyde is prepared in a still and the desired ε-caprolactone added directly thereto just prior to the completion of the dehydration of the condensate. As an illustration of this method, a composition hereinafter referred to as Composition A was prepared as follows:

Composition A

Into a still there was charged 150 parts by weight of Formalin (37%) and 100 parts by weight phenol. Three parts by weight sodium hydroxide were then added and the contents in the still brought to a temperature of 80° C. and maintained at this temperature for 2 hours while under atmospheric pressure. At the end of the two hour period, the contents of the still were neutralized and then brought to a pH of 3.50 to 4.50 by the addition thereto of boric acid (75%). Thereafter, 10 percent by weight of ε-caprolactone, based on the solids introduced into the still just prior to the termination of the dehydration step. Dehydration was continued under a pressure of about 75 mm. Hg at a temperature of about 90° C. to about 100° C. The compositions so obtained upon being cooled to room temperature, about 23° C., was grindable and heat-hardenable, that is, capable of thermosetting to an infusible product.

When the condensate of a phenol and an aldehyde which is to be admixed with an ε-caprolactone is a so-called novolac resin, it is customary to add to the composition a methylene-generating compound which will insure that the composition, when heated, will thermoset to an infusible product. Illustrative of such methylene generating compounds are hexamethylenetetramine, anhydro-formaldehyde-aniline, paraform and the like. A discussion of suitable methylene-generating compounds is to be found in the book by T. S. Carswell previously noted.

When used, the methylene generating compounds are employed in amounts of from about 5 percent by weight to about 20 percent by weight, preferably about 10 percent by weight based on the weight of the condensate of a phenol and an aldehyde. More than 20 percent by weight can be used but this is economically undesirable.

Also, if so desired, any of the conventional catalysts used to promote the thermosetting of phenolic resins can be used, in all instances, as an aid in thermosetting compositions of this invention. These catalysts, when employed, are used in amounts of from about 1 percent by weight to about 20 percent by weight, preferably from about 2 percent by weight to about 6 percent by weight based on the weight of the condensate of a phenol and an aldehyde. Exemplary of such catalysts are the alkali metal hydroxides such as sodium hydroxide, potassium hydroxide and the like; the alkaline earth metal hydroxides such as calcium hydroxide and the like; alkaline earth metal oxides such as calcium oxide and the like.

Compositions of this invention can also contain various other additives, as are well known in the art. Illustrative of such additives, are the so-called fillers which are inert materials usually added to phenolic resin compositions in order to improve the physical characteristics thereof. Illustrative of such fillers are the following: The mineral fillers such as asbestos, wollastonite, mica, silica, graphite, and the like; and organic fillers such as woodflour, cotton flock, polyamide fibers, polyester fibers, graphite cloth, graphite fibers and the like.

Fillers, when used, are generally employed in amounts of from about 15 percent by weight to about 300 percent by weight based on the weight of the condensate of a phenol and an aldehyde.

Other materials, commonly added to phenolic resin compositions, are lubricants such as carnauba wax, candellila wax, calcium stearate and the like; and colorants such as titanium dioxide, organic dyes such as nigrosine and the like.

As previously pointed out, the compositions of this invention have particular utility as compositions which can be molded into articles of desired shape. The exact conditions under which compositions of this invention can be molded will, of course, vary depending in part upon the particular composition being molded and the configuration and size of the article being formed. As a general rule, suitable molding temperatures range from about 150° C. to about 200° C.

Also, as previously pointed out, the compositions of this invention have particular utility in the production of fiber reinforced laminates and composite structures. In producing composite structure, it is convenient to spray a solution of the compositions onto such fibers as glass, rockwool and the like as described in U.S. Pat. 3,014,886 to James Harding, issued Dec. 26, 1961.

It is to be noted that the disclosure of all references noted in this application are incorporated herein by reference.

It is also to be noted that mixtures of the phenolic resins and or caprolactones can be used if so desired.

In the examples below, tests referred to were conducted as follows:

Inclined plate test

One-half gram pellets, of the material to be tested, were placed on a horizontal metal plate which was at a temperature of 125° C. The plate was kept at a horizontal position for one minute after which the plate, with the pellet still in place, was inclined at an angle of 45 degrees and kept in this position for 20 minutes. If the material is fusible, it will either flow or sag. If the material is infusible, that is, if it has thermoset, it will neither flow or sag. The greater the flow the beter the flow characteristics and the less likelihood that the composition will form molding shorts.

Cure-Speed—Indicated by the "gel test"

This test was conducted by placing a one gram sample of the desired composition on a hot plate which was at a temperature of 150 C. The composition was stroked with a spatula and the time required to reach a "no string" condition noted. A "no string" condition is reached when there is no pulling of strings of material, by the spatula, from the main body of the composition. This time was noted as the gel time. A shorter gel time indicates a faster cure time.

Delay molding latitude test

Compositions, under heat and pressure, were formed into preforms, that is, cylinders weighing 25 grams and having the following dimensions:

Height=1 inch
Diameter=2 inches

Each cylinder had a Durometer hardness of 70. The preforms were uniformly heated in an electronic preheater to a temperature of 240° F., allowed to stand at room temperature for a measured period of time and then molded in a 100 ton H.P.M. press at a molding temperature of 335° F. under a pressure of 8,000 p.s.i. This cycle was repeated a number of times using in each case, a different preform formed from the same composition. The time interval, measured from the end of the heating cycle to the beginning of that molding cycle when the composition failed to fill the mold cavity, during the molding cycle, was noted and reported in seconds. A composition having a longer measured time interval, as indicated, is particularly desirable as it allows the operator of the molding apparatus greater latitude as to the use of the compositions once they are formulated.

The following examples further illustrate the present invention.

EXAMPLE 1

This example shows the excellent balance of properties possessed by the compositions of this invention, excellent cure speed as indicated by the "Gel Test" and excellent flow characteristics as indicated by the "Inclined Plate Test."

| Composition | Gel test, seconds | Inclined plate test, mm. |
|---|---|---|
| Composition A (contained 10% by weight ε-caprolactone) | 55 | 57 |
| Composition B (contained 5% by weight ε-caprolactone) | 61 | 79 |
| Composition C (contained 10% by weight ε-caprolactone) | 54 | 99 |
| Composition D (contained 20% by weight ε-caprolactone) | 50 | 135 |
| Control 1 | 93 | 13.5 |
| Control 2 | 77 | 65 |

Composition B was prepared as follows:

One hundred parts by weight phenol and 73 parts by weight formalin (37%) were admixed in a still and the pH thereof adjusted to 1.0–1.1 by the addition thereto of oxalic acid. The mixture was then vacuum refluxed at a temperature of 90° C. to cloudiness. The temperature was gradually increased to 120° C. by the steady increase of pressure and reflux was continued for two hours at a temperature of 120° C. At the end of this two hour period, pressure was released and the system dehydrated. To the phenol-formaldehyde condensate there was then added 5 percent by weight ε-caprolactone and the resultant mixture heated at a temperature of 150° C. for one hour.

Compositions C and D were prepared in the same manner as Composition B with the exception that 10 percent by weight ε-caprolactone was added in preparing Composition C and 20 percent by weight ε-caprolactone was added in preparing Composition D.

Also, in conducting the "Gel Test," 10 percent by weight hexamethylenetetramine, based on the weight of the phenolformaldehyde condensate, was added to Compositions B, C, and D.

Control 1 was prepared in the same manner as described for Composition A with the exception that no ε-caprolactone was added.

Control 2 was prepared in the same manner as described for Composition B with the exception that no ε-caprolactone was added.

EXAMPLE 2

This example illustrates the excellent molding latitude possessed by the compositions of this invention.

Compositions, the formulations of which are noted below, in parts by weight, were prepared by blending the materials on a two-roll mill for a period of 85 seconds, wherein the temperature of the front roll was about 95° C. and the temperature of the back roll was about 150° C.

| | Control 3 | Composition | Control 4 | Composition F |
|---|---|---|---|---|
| Phenol-formaldehyde novolac resin catalyzed with zinc acetate | 44.00 | | | |
| Phenol-formaldehyde novolac resin (zinc acetate catalyzed) plus 10% by weight ε-caprolactone | | 44.00 | | |
| Phenol-formaldehyde resin (same as Control 2) | | | 44.00 | |
| Phenol-formaldehyde resin plus 5% by weight ε-caprolactone (same as Composition B) | | | | 44.00 |
| Hexamethylenetetramine | 6.35 | 6.35 | 6.35 | 6.35 |
| Wood flour | 39.85 | 39.85 | 39.85 | 39.85 |
| Nigrosine | 1.80 | 1.80 | 1.80 | 1.80 |
| Ca(OH)₂ | 2.50 | 2.50 | 2.50 | 2.50 |
| Glycerol monostearate | 0.75 | 0.75 | 0.75 | 0.75 |
| Calcium stearate | 0.75 | 0.75 | 0.75 | 0.75 |
| Asbestos | 4.00 | 4.00 | 4.00 | 4.00 |
| Delay molding latitude, seconds | 135 | 165 | 90 | 120 |

The phenol-formaldehyde novalac resin catalyzed with zinc acetate, was prepared in a manner similar to that described for the resin of Composition B with the exception that zinc acetate was used in lieu of oxalic acid.

Comparable results are achieved using, in lieu of ε-caprolactone, the following lactones in conjunction with the phenolaldehyde resins of Examples 1 and 2.

(1) β-methyl-ε caprolactone
(2) β-chloro-ε caprolactone
(3) γ-ethoxy-ε caprolactone
(4) ε-phenyl-ε caprolactone Comparable results are also achieved using the following phenol-aldehyde resins in conjunction with ε-caprolactone and lactones 1–4 above.

(5) m-sec-butyl phenol-formaldehyde

What is claimed is:

1. A phenolic resin composition consisting essentially of a phenol-aldehyde novolac condensate, formed in an acidic medium, in admixture with an ε-caprolactone in an amount of about 1 percent to about 50 percent by weight based on the weight of said novolac condensate.

2. A composition as defined in claim 1 wherein the phenolic-component of a phenol-aldehyde condensate is phenol.

3. A composition as defined in claim 1 wherein the aldehyde is formaldehyde.

4. A composition as defined in claim 1 wherein the ε-caprolactone has the formula:

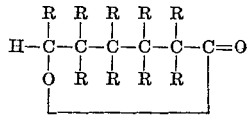

wherein each R is hydrogen, halogen or a monovalent hydrocarbon radical containing a maximum of 12 carbon atoms and wherein at least six R's are hydrogen.

5. A composition as defined in claim 1 wherein the composition contains a methylene generating compound.

6. A composition as defined in claim 5 wherein the methylene generating compound is hexamethylenetetramine.

7. The thermoset product of the composition defined in claim 5.

8. The thermoset product of the composition defined in claim 1.

9. A composition as defined in claim 1 wherein the caprolactone is present in an amount of about 5 percent to about 25 percent by weight.

References Cited

UNITED STATES PATENTS 2,692,865  10/1954  Harris _____ 260—59 X

FOREIGN PATENTS 1,065,605  3/1960  Germany.

HOWARD E. SCHAIN, Primary Examiner

U.S. Cl. X.R.

117—124 E, 141, 161 L; 156—335; 161—257; 260—17.2 R, 38, 49, 51 R, 52.53 Ha, 53 R, 54, 56, 841, 842; 264—331